US011717887B2

(12) United States Patent
Sachs et al.

(10) Patent No.: US 11,717,887 B2
(45) Date of Patent: Aug. 8, 2023

(54) METHODS AND SYSTEMS FOR CONDENSING A VAPOR ON A POWDER BED

(71) Applicant: Desktop Metal, Inc., Burlington, MA (US)

(72) Inventors: Emanuel M. Sachs, Newton, MA (US); Paul A. Hoisington, Hanover, NH (US); Richard Remo Fontana, Cape Elizabeth, ME (US); Jamison Go, Cambridge, MA (US); Joseph Johnson, Concord, MA (US); George Hudelson, Billerica, MA (US); Cassia Lockwood, Lunenburg, MA (US); Michael Goldblatt, Lincoln, MA (US)

(73) Assignee: Desktop Metal, Inc., Burlington, MA (US)

(*) Notice: Subject to any disclaimer, the term of this patent is extended or adjusted under 35 U.S.C. 154(b) by 297 days.

(21) Appl. No.: 16/924,872

(22) Filed: Jul. 9, 2020

(65) Prior Publication Data

US 2021/0008617 A1    Jan. 14, 2021

Related U.S. Application Data

(60) Provisional application No. 62/872,527, filed on Jul. 10, 2019.

(51) Int. Cl.
| B22F 3/10 | (2006.01) |
| B22F 3/00 | (2021.01) |
| B33Y 10/00 | (2015.01) |
| B33Y 30/00 | (2015.01) |

(52) U.S. Cl.
CPC ............ *B22F 3/1007* (2013.01); *B22F 3/003* (2013.01); *B22F 3/1021* (2013.01); *B22F 2201/02* (2013.01); *B22F 2201/50* (2013.01); *B33Y 10/00* (2014.12); *B33Y 30/00* (2014.12)

(58) Field of Classification Search
CPC ...... B22F 3/1007; B22F 3/003; B22F 3/1021; B22F 2201/02; B22F 2201/50; B22F 3/101; B22F 3/004; B22F 2202/00; B22F 2202/03; B22F 2202/09; B33Y 10/00; B33Y 30/00; F26B 5/041; F26B 5/04
See application file for complete search history.

(56) References Cited

U.S. PATENT DOCUMENTS

| 1,975,104 | A | * | 10/1934 | Junkins | ................... F22B 35/10 236/14 |
| 5,067,251 | A | * | 11/1991 | Zlobinsky | ............. F26B 25/006 34/289 |
| 2013/0267045 | A1 | * | 10/2013 | Lee | ..................... C23C 16/5096 118/723 R |
| 2021/0268727 | A1 | * | 9/2021 | Ge | ........................ B29C 64/153 |

* cited by examiner

*Primary Examiner* — Anthony J Zimmer
*Assistant Examiner* — Ricardo D Morales
(74) *Attorney, Agent, or Firm* — Oak Law, PLLC; Jonathan D. Hall

(57) ABSTRACT

A method is provided for printing a three-dimensional object. The method comprises, depositing a layer of metal powder onto a powder bed of a three-dimensional printer. A liquid is heated to generate a vapor. The liquid is removed from the vapor to dry the vapor by heating the vapor above a condensation temperature of the liquid. The dry vapor is deposited onto the powder bed of the three-dimensional printer.

16 Claims, 9 Drawing Sheets

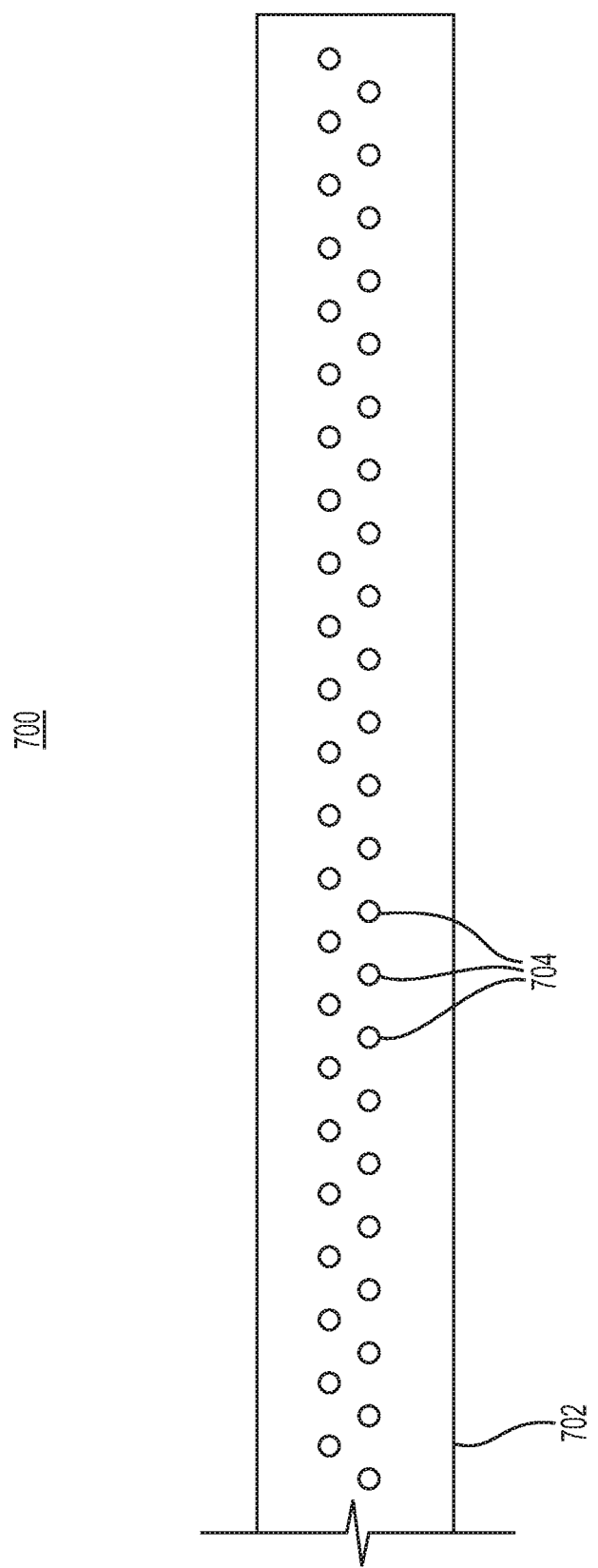

METHODS AND SYSTEMS FOR CONDENSING A VAPOR ON A POWDER BED

RELATED APPLICATION

This application claims the benefit of U.S. Provisional Application No. 62/872,527, filed on Jul. 10, 2019. The entire teachings of the above application are incorporated herein by reference.

DESCRIPTION

Technical Field

Various aspects of the present invention relate generally to systems and methods for depositing vapor on a powder bed when fabricating components using additive manufacturing.

BACKGROUND

Powder bed three-dimensional fabrication is an additive manufacturing technique based on binding particles of a powder to form a three-dimensional object within the powder bed. Binder jetting is one type of powder bed three-dimensional fabrication. Binder jetting includes delivering powder, e.g., metal powder, to a powder bed, spreading the powder into a layer, and depositing a binder material, e.g., a liquid binder, on top of the powder to bind the powder together. The binder material is deposited in a pre-determined pattern (e.g., in a cross-sectional shape of the three-dimensional object) to successive layers of powder in a powder bed such that the powder particles bind to one another where the binder material is located to form a three-dimensional green part. In the context of binder jet printing of three-dimensional metal objects, a three-dimensional green part may be formed by printing as described above, and may then be processed further into a finished three-dimensional metal part. For example, excess, unbound metal powder may be removed from the powder bed. Then, the three-dimensional green part may be heated in a furnace to remove the binder material or sintered to form the final, three-dimensional part.

When printing the green part, there may be unintended movement of the powder during layer-by-layer formation of the three-dimensional object or by subsequent processing of the three-dimensional object to form the finished part. Additionally, powder may be ejected from the powder bed and onto the print head during the printing process. For example, as the binder material is jetted from the print head into the powder bed, the impact of droplets of the binder on the particles of the powder may cause ejection of powder particles. The ejected particles, and potentially binder carried with them, may redeposit on the print head, blocking or clogging nozzle orifices or otherwise degrading the print head. Such degradation may compromise accuracy of placement of binder along the powder bed, thus producing defects in the three-dimensional object, and ultimately in the finished part.

The systems and methods of the current invention may address one or more of the deficiencies described above or may address other aspects of the prior art.

SUMMARY

Examples of the present invention relate to, among other things, systems and methods for fabricating components using additive manufacturing. Each of the examples disclosed herein may include one or more of the features described in connection with any of the other disclosed examples.

The present invention includes a method for printing a three-dimensional object. The method comprises depositing a layer of metal powder onto a powder bed of a three-dimensional printer, heating a liquid to generate a vapor, removing the liquid from the vapor to dry the vapor by heating the vapor above a condensation temperature of the liquid, and depositing the dry vapor into the powder bed of the three-dimensional printer.

According to some aspects, flow of the vapor is controlled prior to depositing the vapor. The dry vapor may flow through a branching distribution system prior to being deposited onto the powder bed. The dry vapor may flow through a plenum space prior to being deposited onto the powder bed. The heated liquid may be water. A carrier gas may be introduced to dry the vapor, and the carrier gas may be at least one of nitrogen or air. A subsequent layer of metal powder may be deposited onto the powder bed of the three-dimensional printer, and dry vapor may be deposited onto the powder bed of the three-dimensional printer.

The present invention also includes a system for printing a three-dimensional object. The system comprises a powder bed configured to receive one or more layers of metal powder, a vapor generator configured to heat a liquid to form a vapor, a drying subsystem configured to heat the vapor to remove the liquid from the vapor to dry the vapor, and a vapor deposition subsystem configured to delivery the dry vapor to a surface of the powder bed.

According to some aspects, the vapor generator may include at least one of a boiler, a heated surface, a heating coil, or an atomizing nozzle. The system may further include a vapor distribution subsystem configured to distribute the dry vapor across the deposition subsystem. The vapor distribution subsystem may include at least one of a branching distribution system or a plenum space. The vapor deposition subsystem may include at least one of an orifice plate, a nozzle, or a plenum space. The vapor deposition subsystem may include a pair of parallel plates spaced apart from one another to form a gap. The first of the pair of parallel plates may define a plurality of openings, and a second of the pair of parallel plates may have a first surface facing the first parallel plate and a second surface adjacent to a plenum space.

Furthermore, the present invention includes a system for printing a three-dimensional object. The system comprises a powder bed configured to receive one or more layers of metal powder, a boiler configured to heat a liquid to form a vapor, a heater for heating the vapor to remove the liquid from the vapor to dry the vapor, a diffuser fluidly coupled to the plenum space, and a nozzle fluidly coupled to the plenum space and configured to deliver the dry vapor to the powder bed.

According to some aspects, a valve may be configured to control a flow of the dry vapor. The nozzle may include a pair of parallel plates spaced apart from one another to form a gap, wherein a first of the pair of parallel plates defines a plurality of openings, and wherein a second of the pair of parallel plates has a first surface facing the first parallel plate and a second surface adjacent to the plenum space. The system may also include a branching distribution system fluidly connected to the plenum space. The system may include a piston system fluidly coupled to the boiler, and the nozzle may include an orifice plate.

Both the foregoing general description and the following detailed description are exemplary and explanatory only and are not restrictive of the features, as claimed. As used herein, the terms "comprises," "comprising," "including," "having," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. The terms "object," "part," and "component," as used herein, are intended to encompass any object fabricated through the additive manufacturing techniques described herein.

It should be noted that all numeric values disclosed or claimed herein (including all disclosed values, limits, and ranges) may have a variation of +/−10% (unless a different variation is specified) from the disclosed numeric value. In this invention, unless stated otherwise, relative terms, such as, for example, "about," "substantially," and "approximately" are used to indicate a possible variation of +/−10% in the stated value. Moreover, in the claims, values, limits, and/or ranges of various claimed elements and/or features means the stated value, limit, and/or range +/−10%.

BRIEF DESCRIPTION OF THE DRAWINGS

The accompanying drawings, which are incorporated in and constitute a part of this specification, illustrate various exemplary embodiments, and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this invention.

FIG. 7 is a diagram of another example nozzle system of the steam delivery device, according to aspects of the present invention.

DETAILED DESCRIPTION

Embodiments of the present invention include systems and methods to facilitate or improve the efficacy or efficiency of additive manufacturing. Reference now will be made in detail to examples of the present invention described above and illustrated in the accompanying drawings. Wherever possible, the same reference numbers will be used throughout the drawings to refer to the same or like parts.

Figure 1A:
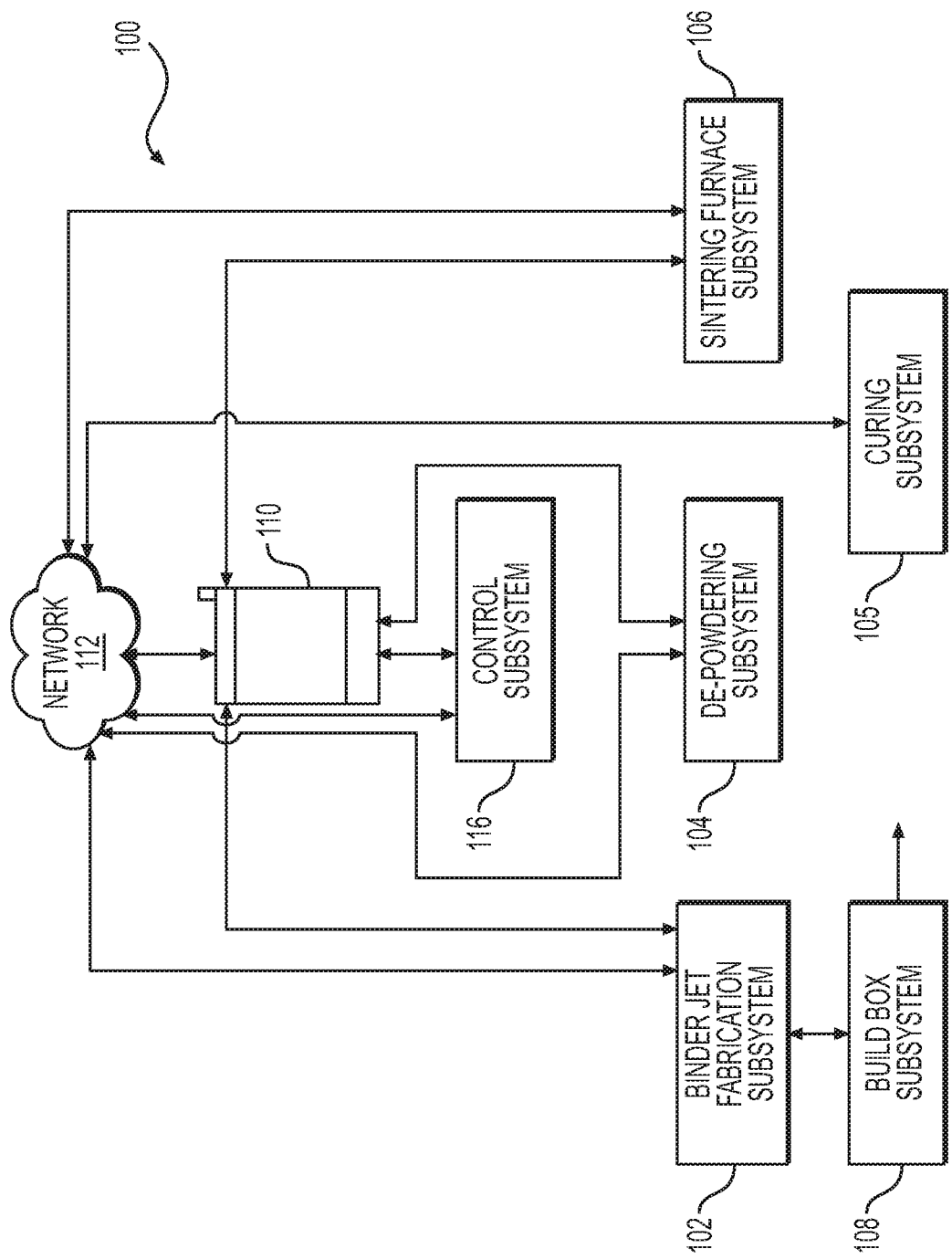
FIG. 1A is a block diagram of an additive manufacturing system.

FIG. 1A illustrates an exemplary system 100 for forming a printed object, according to an embodiment of the present invention. System 100 may include a printer, for example, a binder jet fabrication subsystem 102, and a treatment site(s), for example, a de-powdering subsystem 104, a curing subsystem 105, and a sintering furnace subsystem 106. Binder jet fabrication subsystem 102 may be used to form an object from a build material, for example, by delivering successive layers of a powder build material and binder material to a build plate. As shown in FIG. 1A, a build box subsystem 108 may be movable and may be selectively positioned in one or more of binder jet fabrication subsystem 102, de-powdering subsystem 104, curing subsystem 105, and sintering furnace subsystem 106. For example, build box subsystem 108 may be coupled or couplable to a movable assembly. Alternatively, a conveyor (not shown) may help transport the object between portions of system 100.

The build material may be a bulk metallic powder delivered and spread in successive layers. The binder material may be, for example, a polymer-containing fluid that may be deposited onto and may be absorbed into layers of the build material. One or more of binder jet fabrication subsystem 102, de-powdering subsystem 104, curing subsystem 105, and sintering furnace subsystem 106 may include a shaping station to shape the printed object and a debinding station to treat the printed object to remove binder material from the build material. Furnace subsystem 106 may heat or sinter the build material of the printed object. System 100 may also include a user interface 110, which may be operatively coupled to one or more components, for example, to binder jet fabrication subsystem 102, de-powdering subsystem 104, and sintering furnace subsystem 106, etc. In some embodiments, user interface 110 may be a remote device (e.g., a computer, a tablet, a smartphone, a laptop, etc.). User interface 110 may be wired or wirelessly connected to one or more of binder jet fabrication subsystem 102, de-powdering subsystem 104, and sintering furnace subsystem 106. System 100 may also include a control subsystem 116, which may be included in user interface 110, or may be a separate element.

Binder jet fabrication subsystem 102, de-powdering subsystem 104, curing subsystem 105, sintering furnace subsystem 106, user interface 110, and/or control subsystem 116 may be connected to the other components of system 100 directly or via a network 112. Network 112 may include the Internet and may provide communication through one or more computers, servers, and/or handheld mobile devices, including the various components of system 100. For example, network 112 may provide a data transfer connection between the various components, permitting transfer of data including, e.g., geometries, the printing material, one or more support and/or support interface details, binder materials, heating or sintering times and temperatures, etc., for one or more parts or one or more parts to be printed.

Moreover, network 112 may be connected to a cloud-based application (not shown in FIG. 1), which may also provide a data transfer connection between the various components and cloud-based application in order to provide a data transfer connection, as discussed above. Cloud-based application may be accessed by a user in a web browser, and may include various instructions, applications, algorithms, methods of operation, preferences, historical data, etc., for forming the part or object to be printed based on the various user-input details. Alternatively or additionally, the various instructions, applications, algorithms, methods of operation, preferences, historical data, etc., may be stored locally on a local server (not shown) or in a storage or processing device within or operably coupled to one or more of binder jet fabrication subsystem 102, de-powdering subsystem 104, sintering furnace subsystem 106, user interface 110, and/or control subsystem 116. In this aspect, binder jet fabrication subsystem 102, de-powdering subsystem 104, sintering furnace subsystem 106, user interface 110, or control subsystem 116 may be disconnected from the Internet or other networks, which may increase security protections for the components of system 100. In either aspect, an additional controller (not shown) may be associated with one or more of binder jet fabrication subsystem 102, de-powdering subsystem 104, and sintering furnace subsystem 106, etc., and may be configured to receive instructions to form the printed object and to instruct one or more components of system 100 to form the printed object.

Figure 1B:
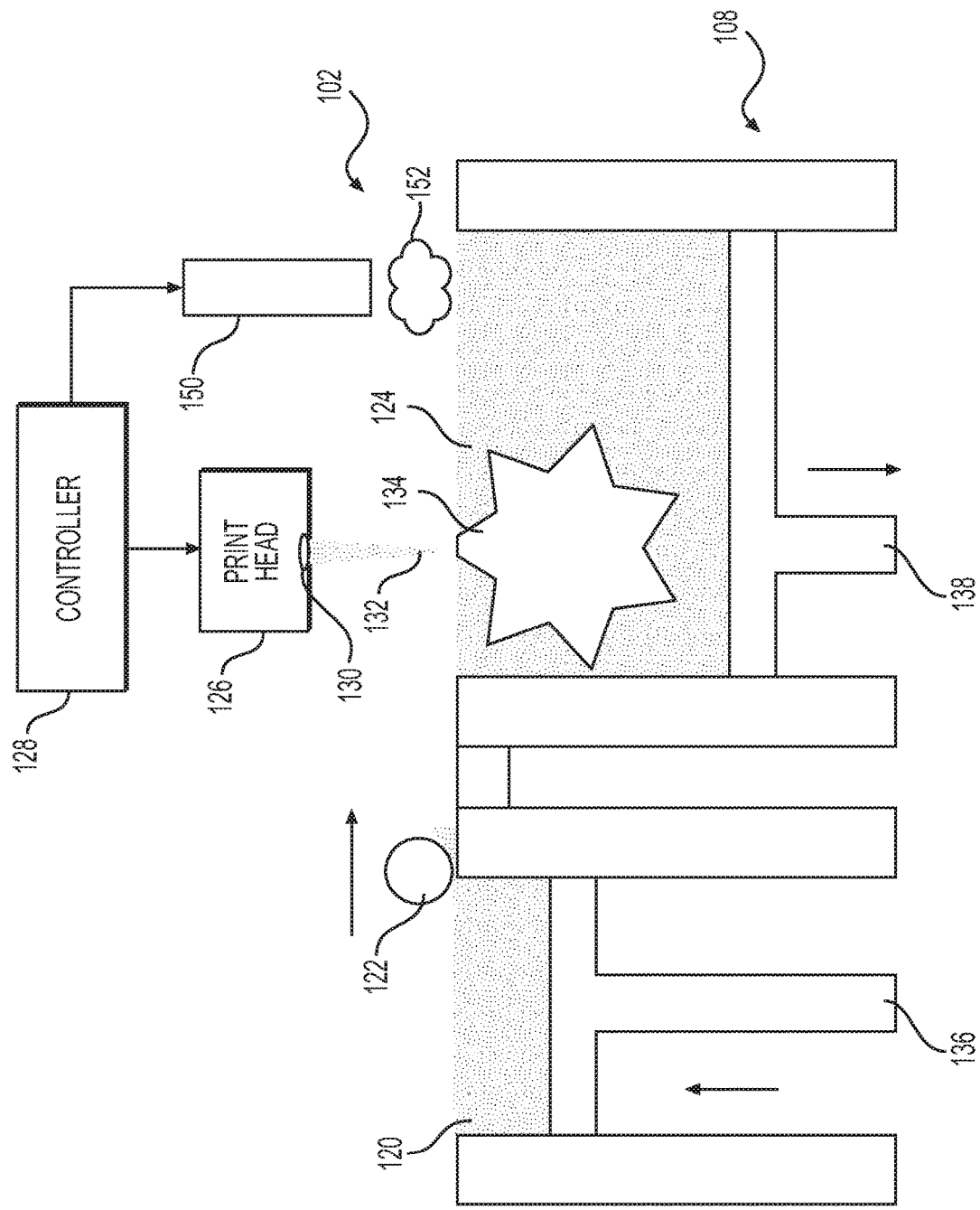
FIG. 1B illustrates an exemplary fabrication subsystem.

FIG. 1B illustrates an exemplary binder jet fabrication subsystem 102 operating in conjunction with build box subsystem 108. Binder jet fabrication subsystem 102 may include a powder supply 120, a spreader 122 (e.g., a roller) configured to be movable across powder bed 124 of build box subsystem 108, a print head 126 movable across powder bed 124, and a controller 128 in operable communication (e.g., wireless, wired, Bluetooth, etc.) with print head 126. Powder bed 124 may comprise powder particles, for example, micro-particles of a metal, micro-particles of two or more metals, or a composite of one or more metals and other materials, such as ceramics and polymers.

Spreader 122 may be movable across powder bed 124 to spread a layer of powder, from powder supply 120, across powder bed 124. Print head 126 may comprise a discharge orifice 130 and, in certain implementations, may be actuated to dispense a binder material 132 (e.g., through delivery of an electric current to a piezoelectric element in mechanical communication with binder material 132) through discharge orifice 130 to the layer of powder spread across powder bed 124. In other embodiments, orifice 130 may be replaced with a capillary tube or a piece of sintered metal, for example. In some embodiments, the binder material 132 may be one or more fluids configured to bind together powder particles.

FIG. 1B also shows a vapor deposition device 150 that is configured to deposit vapor (e.g., steam) 152 on the powder bed 124 prior to deposition of binder material 132, as discussed further below.

In operation, controller 128 may actuate print head 126 to deliver binder material 132 from print head 126 to successive layers of the powder in a pre-determined two-dimensional pattern, as print head 126 moves across powder bed 124. In embodiments, the movement of print head 126, and the actuation of print head 126 to deliver binder material 132, may be coordinated with movement of spreader 122 across powder bed 124. For example, spreader 122 may spread a layer of the powder across powder bed 124, and print head 126 may deliver the binder in a pre-determined, two-dimensional pattern, to the layer of the powder spread across powder bed 124, to form a layer of one or more three-dimensional objects 134. These steps may be repeated (e.g., with the pre-determined two-dimensional pattern for each respective layer) in sequence to form subsequent layers until, ultimately, the one or more three-dimensional objects 134 are formed in powder bed 124.

Although the example embodiment depicted in FIG. 1B depicts a single object 134 being printed, it should be understood that the powder bed 124 may include more than one object 134 in embodiments in which more than one object 134 is printed at once. Further, the powder bed 124 may be delineated into two or more layers, stacked vertically, with one or more objects disposed within a layer.

An example binder jet fabrication subsystem 102 may comprise a powder supply actuator mechanism 136 that elevates powder supply 120 as spreader 122 layers the powder across powder bed 124. Similarly, build box subsystem 108 may comprise a build box actuator mechanism 138 that lowers powder bed 124 incrementally as each layer of powder is distributed across powder bed 124.

In another example embodiment, layers of powder may be applied to powder bed 124 by a hopper (e.g., a metering device) followed by a spreading device (for example a roller). The hopper may move across powder bed 124, depositing powder along the way. The compaction roller may be configured to follow the hopper, spreading the deposited powder to form a layer of powder.

Figure 1C:
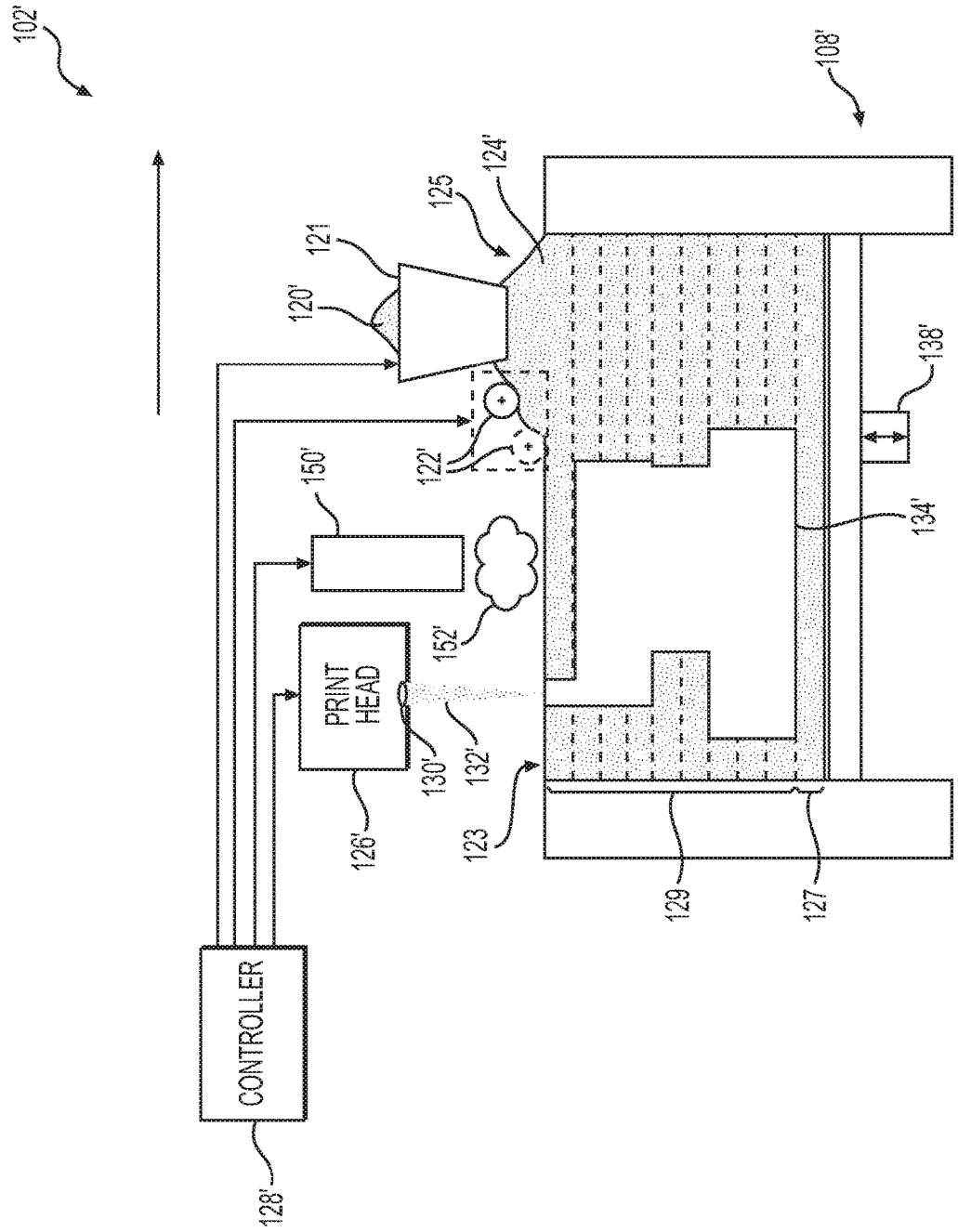
FIG. 1C illustrates another exemplary fabrication subsystem, according to aspects of the present invention.

For example, FIG. 1C illustrates another binder jet fabrication subsystem 102' operating in conjunction with a build box subsystem 108'. In this aspect, binder jet fabrication subsystem 102' may include a powder supply 120' in a metering apparatus, for example, a hopper 121. Binder jet subsystem 102' may also include one or more spreaders 122' (e.g., one or more rollers) configured to be movable across powder bed 124' of build box subsystem 108', a print head 126' movable across powder bed 124', and a controller 128' in operable communication (e.g., wireless, wired, Bluetooth, etc.) with one or more of hopper 121, spreaders 122', and print head 126'. Powder bed 124' may comprise powder particles, for example, micro-particles of a metal, micro-particles of two or more metals, or a composite of one or more metals and other materials.

Hopper 121 may be any suitable metering apparatus configured to meter and/or deliver powder from powder supply 120' onto a top surface 123 of powder bed 124'. Hopper 121 may be movable across powder bed 124' to deliver powder from powder supply 120' onto top surface 123. The delivered powder may form a pile 125 of powder on top surface 123.

The one or more spreaders 122' may be movable across powder bed 124' downstream of hopper 121 to spread powder, e.g., from pile 125, across powder bed 124. The one or more spreaders 122' may also compact the powder on top surface 123, or a separate compaction device, e.g., roller, may also be included. In either aspect, the one or more spreaders 122' (or compaction devices) may form a layer 127 of powder. The aforementioned powder delivery and spreading steps may be successively performed in order to form a plurality of layers 129 of powder. Additionally, although two spreaders 122' are shown in FIG. 1C, binder jet fabrication subsystem 102' may include one, three, four, etc. spreaders 122'.

Print head 126' may comprise one or more discharge orifices 130' (or, alternatively, a capillary tube or a piece of sintered metal) and, in certain implementations, may be actuated to dispense a binder material 132' (e.g., through delivery of an electric current to a piezoelectric element in mechanical communication with binder material 132') through discharge orifice 130' to the layer of powder spread across powder bed 124'. In some embodiments, the binder material 132' may be one or more liquids configured to bind together powder particles.

In operation, controller 128' may actuate print head 126' to deliver binder material 132' from print head 126' to each layer 127 of the powder in a pre-determined two-dimensional pattern, as print head 126' moves across powder bed 124'. As shown in FIG. 1C, controller 128' may be in communication with hopper 121 and/or the one or more spreaders 122' as well, for example, to actuate the movement of hopper 121 and the one or more spreaders 122' across powder bed 124'. Additionally, controller 128' may control the metering and/or delivery of powder by hopper 121 from powder supply 120 to top surface 123 of powder bed 124'. In embodiments, the movement of print head 126', and the actuation of print head 126' to deliver binder material 132', may be coordinated with movement of hopper 121 and the one or more spreaders 122' across powder bed 124'. For example, hopper 121 may deliver powder to powder bed 124, and spreader 122' may spread a layer of the powder across powder bed 124. Then, print head 126 may deliver the binder in a pre-determined, two-dimensional pattern, to the layer of the powder spread across powder bed 124', to form a layer of one or more three-dimensional objects 134'. These steps may be repeated (e.g., with the pre-determined two-dimensional pattern for each respective layer) in sequence to form subsequent layers until, ultimately, the one or more three-dimensional objects 134' are formed in powder bed 124'.

Although the example embodiment depicted in FIG. 1C depicts a single object 134' being printed, it should be understood that the powder bed 124' may include more than one object 134' in embodiments in which more than one object 134' is printed at once. Further, the powder bed 124' may be delineated into two or more layers 127, stacked vertically, with one or more objects disposed within a layer.

As in FIG. 1B, build box subsystem 108' may comprise a build box actuator mechanism 138' that lowers powder bed 124' incrementally as each layer 127 of powder is distributed across powder bed 124'. Accordingly, hopper 121, the one or more spreaders 122', and print head 126' may traverse build box subsystem 108' at a pre-determined height, and build box actuator mechanism 138' may lower powder bed 124 to form object 134'.

Although not shown, binder jet fabrication subsystems 102, 102' may include a coupling interface that may facilitate the coupling and/or uncoupling of the build box subsystems 108, 108' with the binder jet fabrication subsystems 102, 102', respectively. The coupling interface may comprise one or more of (i) a mechanical aspect that provides for physical engagement, and/or (ii) an electrical aspect that supports electrical communication between the build box subsystem 108, 108' to the binder jet fabrication subsystem 102, 102'.

It should be appreciated that the techniques herein may reference aspects of FIGS. 1A-1C (e.g., the binder jet fabrication subsystem 102, the powder bed 124, the print head 126, etc.). Any reference to systems or components in FIGS. 1A and 1B may also be applicable to corresponding components in FIG. 1C (e.g., reference numerals with corresponding prime (') designations). For example, references and descriptions to the binder jet fabrication subsystem 102 may also be applicable to the binder jet fabrication subsystem 102', references and descriptions to the powder bed 124 may also be applicable to the powder bed 124', and so on.

As stated above, during the printing process, powder may be ejected onto the print head 126 as binder material 132 is deposited onto the powder bed 124. This powder ejecta may be avoided or mitigated, for example, by changing the cohesion of the powder particles to each other in successive layers of the powder bed 124. In one example, powder cohesion may be changed during the print process by adding a fine layer of condensation to the powder bed 124. As described by the techniques herein, the condensation layer may be added to a layer of the powder bed 124 by depositing vapor, e.g., steam or a steam mixture, which may or may not include a carrier gas, on the layer of the powder bed 124. As used herein, depositing vapor "on the layer" may be understood to mean that the vapor is deposited onto particles of powder on the surface of the powder bed 124 and potentially onto particles of powder beneath the surface, including powder particles in previously deposited powder layers. Deposition of the condensation layer may be automatically or manually controlled, since too much condensation may result in uneven spreading of the powder between layers or trapped air. This may lead to defective parts during the printing process. Too much condensation may also cause undesirable spreading of binder material (e.g., bleeding).

Existing options for solving the powder ejecta problem may slow operation speeds and may actually increase powder ejecta issues. The techniques described herein are drawn to a steam generation and delivery system for use in binder jet fabrication system 102 (for example, the vapor deposition device 150) to deliver steam and/or a steam mixture to the powder bed 124. These techniques may enable condensation to occur on a layer of the powder bed 124 to increase powder cohesion and/or to decrease mobility of the powder on the powder bed 124, which may reduce or eliminate powder ejecta during binder deposition. In some aspects, reduced powder mobility may be effective to prevent "beading" failure modes that may result from surface tension of the binder material 132 pulling together powder particles into clumps, which may be taller than a powder layer and thus may result in smearing. The condensation layer may improve the integrity of the part being printed or the reliability or quality of the print heads used in the process, or may address other deficiencies in the art. In one example, U.S. patent application Ser. No. 16/243,966, the entirety of which is incorporated herein by reference, describes benefits of increasing powder cohesion.

Figure 2:
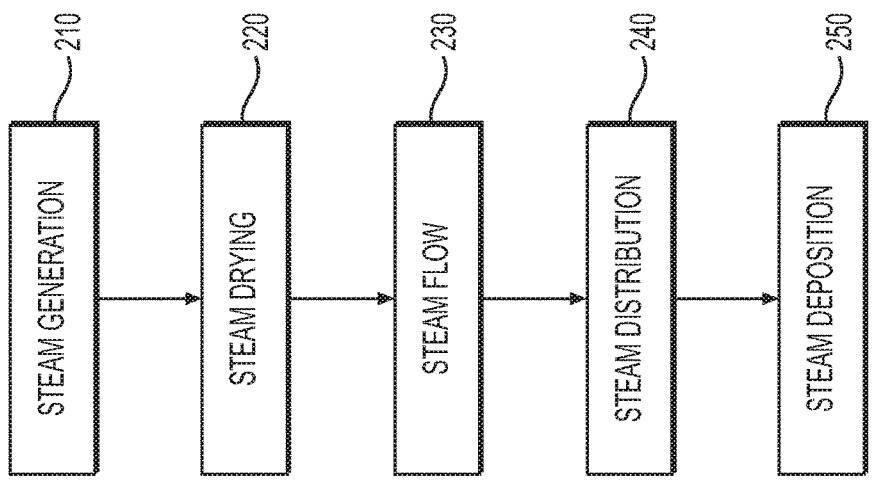
FIG. 2 is a flow chart showing processes of an example steam generation and delivery system, according to the present invention.

Reference is now made to FIG. 2, which shows a flow chart 200 depicting processes of an example vapor generation and delivery system (also referred to herein as the "steamer system"), according to the present invention. Various subsystems or combinations of subsystems may operate to perform the following functionality. First, a liquid may be vaporized to form a gas, referred to in FIG. 2 as steam generation 210. Although steam (i.e., the vapor of water) is described herein, any suitable fluid may be vaporized. Next, the vapor (e.g., steam) may be dried at step 220, and liquid may be removed from the vapor, which may be accomplished by heating the vapor. Next, the vapor (e.g., steam) may be flowed out of the drying subsystem, step 230, for vapor distribution, step 240. During flow, carrier gas may be added to and mixed with the vapor, although a carrier gas is not required. Vapor distribution may be performed to promote more even distribution of the vapor to the vapor deposition step (25). Additional details of this method and the subsystems that may perform each function are described further below.

As an initial note, the steamer system may be made up of five subsystems including: a steam generation subsystem (to perform step 210), a steam drying subsystem (to perform step 220), a steam flow subsystem (to perform step 230), a steam distribution subsystem (to perform step 240), and a steam deposition system (to perform step 250). It should be appreciated though that each of the subsystems described herein may operate as individual subsystems or may be combined into multi-function subsystems, or may be further divided into additional subsystems. For example, the steam generation subsystem may perform steam generation operations, shown at reference numeral 210, and steam drying operations, shown at reference numeral 220, or, there may be separate subsystems to perform steam generation and steam drying. In some embodiments, the steam distribution subsystem may also perform steam drying operations, shown at reference numeral 220, or the steam distribution system may be separate from a steam drying subsystem. In one example, the steam drying subsystem may be an optional subsystem, and some embodiments may not include a steam drying step. For example, if a piston is used to control steam flow, a steam drying subsystem may not be used to dry the steam. In some embodiments, the steam flow subsystem may perform steam flow operations 230, the steam distribution subsystem may perform steam distribution operations 240, and the steam deposition subsystem may perform steam deposition operations 250. These subsystems and their associated operations are described in more detail herein.

Briefly, the steam generation subsystem may be configured to perform the steam generation operations 210, for example, heating liquid to form steam from deionized or distilled water, or to form vapor from another suitable liquid. To form steam, the steam generation subsystem may operate at temperatures between about 100 degrees Celsius and about 210 degrees Celsius, although the steam generation subsystem may operate at other temperature ranges, depending on the boiling point of the liquid being vaporized or the operation pressure of the system.

The steam drying subsystem is configured to perform the steam drying operation 220 to reduce or remove liquid from the generated vapor. This may be accomplished by heating the vapor and a surface above the vapor to a temperature over a condensation temperature of the gas, as described herein.

The steam flow subsystem is configured to perform the steam flow operations 230 to transport the steam from one subsystem to the next (e.g., from the steam generation subsystem or the steam drying subsystem to the steam distribution subsystem). In some embodiments, the steam flow subsystem may introduce a carrier gas, such as air, nitrogen, or another suitable gas, although in other embodiments, no carrier gas may be introduced.

The steam distribution subsystem is configured to perform the steam distribution operations 240, e.g., to control how evenly the steam goes to the steam deposition subsystem. The steam deposition subsystem may facilitate a more even and uniform deposition of steam from the steamer system so that different portions of the powder bed 124 do not receive substantially different amounts of steam, which may cause variations in rates of bleeding or powder ejecta across the powder bed.

The steam deposition subsystem is configured to perform steam deposition operations 250, e.g., to control the velocity and flow of the exiting steam with tolerances to promote uniformity. In one example, the amount of steam deposited on the powder bed 124 may be determined by a ratio of condensation/fluid to void space in a top layer the powder bed 124. For example, a top layer of the powder bed 124 may be made up of about 40% void space, and the steam generation and delivery system may deposit a sufficient amount of steam on the powder bed 124 such that the volume of condensed steam divided by the void space in the top layer is between about 0.1% to 10%

It should be appreciated that while the invention may describe the steamer system as generating and delivering steam, the steamer system may be configured to generate a vapor phase for a wide range of liquids with the steamer system operating under different temperature and pressure conditions than those described herein, depending on the type of liquid used. Additionally, the techniques described herein are applicable to gases other than steam. For example, the techniques herein are applicable to steam or steam mixed with one or more other carrier gases, such as air, nitrogen, or other known or contemplated gases. For simplicity, the techniques are described using water/steam as an example.

The purpose of the steam generation subsystem is to turn a liquid (e.g., water) into a vapor phase (e.g., steam). The steam generation subsystem may be configured to maintain a fluid within it in both a gaseous and a liquid phase, e.g., in a two-phase equilibrium. This may be accomplished by varying the temperature, pressure, or both, of the steam generation subsystem. For example, in some embodiments, a temperature sensor may be operably coupled to the steam generation subsystem, and the temperature of the steam generation subsystem may be directly controlled. In some embodiments, a pressure sensor may be operably coupled to the steam generation subsystem, and the pressure of the steam generation subsystem may be directly controlled. In some embodiments, both a temperature and a pressure sensor may be operably coupled to the steam generation subsystem, and both temperature and pressure may be controlled. If temperature is controlled, then a pressure of the steam generation subsystem may be based on the pre-determined temperature, and, if the pressure is controlled, then a temperature of the steam generation subsystem may be based on the pre-determined pressure needed to maintain the fluid in both a liquid and a vapor phase.

In some embodiments, the steam generation subsystem may include a boiler to generate steam. The boiler may include a heated tube or closed volume that contains water. The water may not take up the entire closed volume, so that the remainder of the volume may be occupied by the steam being generated. In one example, the water may fill approximately half of the closed volume or up to the entire closed volume with superheated, high-pressure water, and steam may be removed from the container by removing the water from the container at a lower pressure. The closed volume may be heated to may be heated to between about 100 degrees Celsius to about 200 degrees Celsius to boil water into steam, although this may also depend on the pressure at which the closed volume is operated. The water level in the boiler may be controlled using one or more pressure transducers, float valves, level or float switches, thermal dispersion switches, self-heating thermistors, or by manually pumping water when the water level appears too low.

Figure 3:
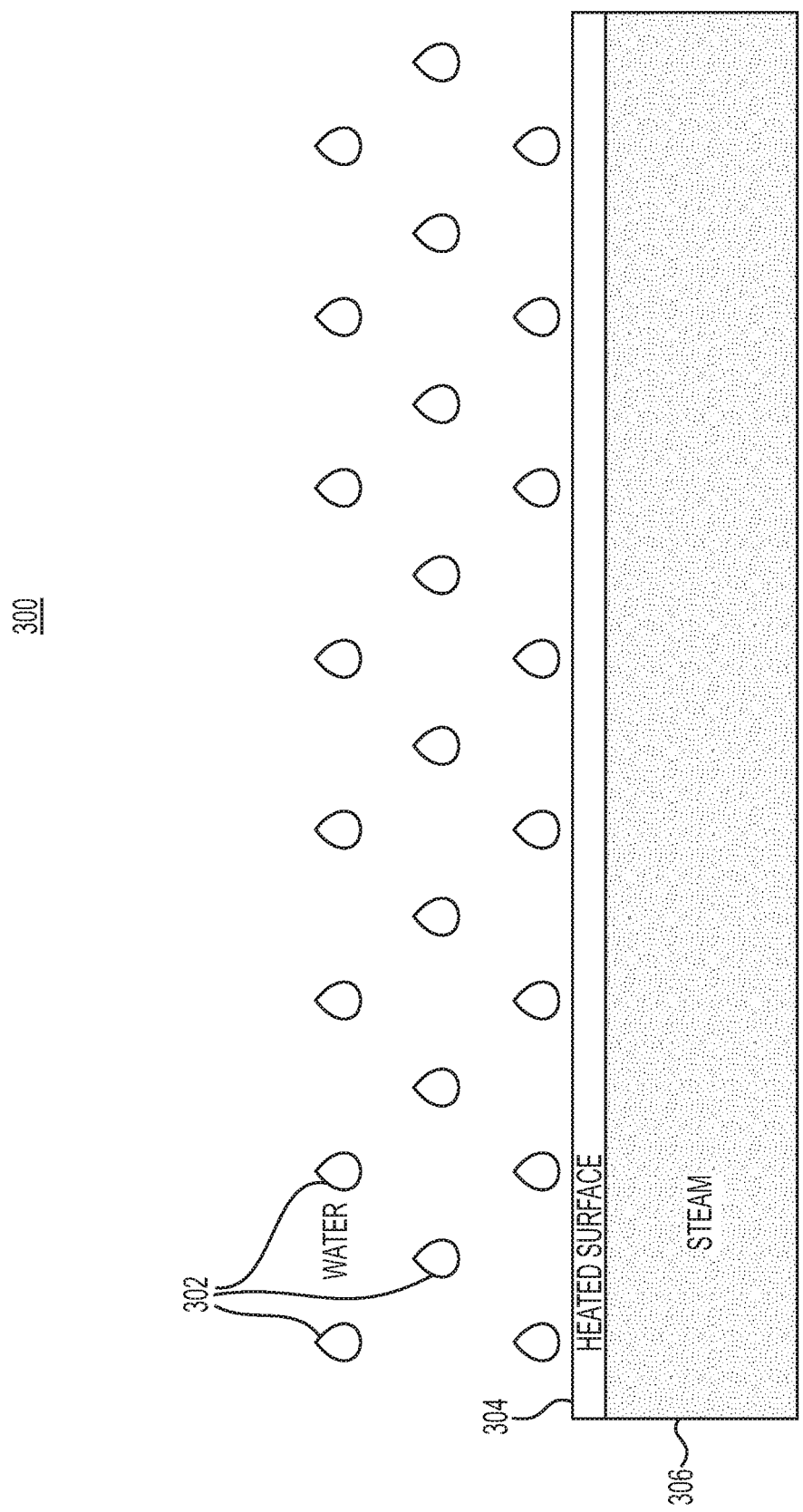
FIG. 3 is a diagram of an example steam generation process of a steam delivery device, according to aspects of the present invention.

FIG. 3 shows an example embodiment for generating steam. The steam generation system shown in FIG. 3 may be, for example, utilized in the steam generation subsystem, described above. In FIG. 3, water droplets 302 may be deposited onto a heated surface 304 to generate steam 306. The water droplets 302 may be, for example, between about 1 micrometer (μm) to about 1000 μm. The heated surface 304 may comprise a metal that is heated to a sufficient temperature to generate the steam, depending on the type of liquid used (i.e., heated to a temperature at or above a boiling point of liquid). In some embodiments, the heated surface 304 may be inert relative to the liquid. Stainless steel, brass, an/or anodized aluminum may be used, for example, as the heated surface 304 to generate the water droplets 302 or droplets of a wide range of other fluids.

In some embodiments, the water droplets 302 may be generated by an inkjet print head (e.g., print head 126) or a fuel ejector. In some embodiments, the water droplets 302 may be generated using an atomizing nozzle (with or without ultrasonic excitation), and the flow of the water to a nozzle may be controlled, for example, with a mass flow controller (MFC). In another embodiment, steam may be generated by running water through heating coils. For example, an atomizing nozzle (with or without ultrasonic agitation) may be supplied with liquid, e.g., water, from a pressurized reservoir. The flow of liquid, e.g., water, may be controlled by a MFC, which may allow for control of a flow rate of water (e.g., about 5 milliliters (mL) per minute). The water may flow to the atomizing nozzle, which may cause the water flow to break up into droplets (e.g., the water droplets 302). Optionally, a flow of gas may be used to shape and direct the droplets towards the heated surface 304 (e.g., into a cone or fan shape). The flow of water may be interrupted (e.g., turned on or off) by means of a valve located between the water supply and the atomizing nozzle.

To generate steam, e.g., with a boiler, temperature and/or pressure may be controlled, and there may be tradeoffs in setting the boiler pressure. Higher pressures may achieve a required fluidic capacity at lower volumes. In one example, fluidic capacity may indicate an amount of pressure change for a given amount of steam removed from the boiler. It may be desirable to have a large fluidic capacity (e.g., in grams per pascal) such that the pressure may change little as the flow of steam is started and stopped. Such well-controlled pressure may improve the control of steam flow. The gas phase of the boiler may have a fluidic capacity that is proportional to the volume of the boiler multiplied by the absolute pressure of the boiler. The liquid in the boiler may have a fluidic capacity that sums with the gas capacity to result in a total capacity of the boiler. A given volume of liquid may have a greater fluidic capacity than the gas phase, and thus it may be desirable to use as much liquid in the boiler as possible, but not an amount that results in liquid bubbling over the top of the boiler, which could, in some scenarios, result in liquid exiting the boiler along with the steam. When steam is released from a boiler and the pressure drops, then the remaining water within the boiler may be caused to boil. Accordingly, if the boiler is filled mostly with water, then the pressure disturbance when the flow of steam is started and stopped may be lower.

Also, higher pressures may require use of higher temperatures, and, as a result, the steam pressure may be less sensitive to changes in temperature (i.e. more easily controlled). For example, steam tables may show that for a given level of control of boiler temperature (e.g., +/−1 degree Celsius), the higher the operating temperature of the boiler, the smaller the percentage change in pressure that results from the variation in temperature. However, lower pressures may enable use of larger flow control orifices (e.g., nozzles) for steam deposition, as will be discussed further in reference to an exemplary embodiment below.

After the steam generation subsystem generates steam, the steam exiting the steam generator, e.g., the boiler, may be dried to remove liquid from the steam before the liquid flows to the nozzle. Accordingly, the function of the steam drying system is to prevent liquid from escaping the steam generation subsystem and being introduce into the steam flow or the steam distribution subsystem. By condensing liquid out of the gas to be deposited to the powder bed 124, powder mobility may be decreased. For example, if the steam generation subsystem (e.g., a boiler) produces a violent nucleation, bubbles of liquid may propagate further than desired. If liquid water reaches a flow control orifice of the steam distribution subsystem, the flow rate of steam may vary unacceptably.

The steam drying subsystem may be part of the steam generation subsystem or may be a separate subsystem. In one embodiment, to dry the steam, the steam 306 and the heated surface 304 may be heated to a temperature at or above a condensation temperature or saturation temperature of the steam. In some embodiments, e.g., the boiler steam generation embodiment described above, a slight temperature gradient may be maintained across the boiler to facilitate drying of the steam exiting the boiler. For example, the area of the boiler with steam may be about 10 degrees Celsius warmer than the area of the boiler containing water. In this embodiment, steam generation and steam drying may be performed by the same subsystem. Other exemplary steam drying systems (also known in the art as steam separators) may include one or more engines, turbines, atomizers, steam accumulators, or other suitable systems.

Once the steam drying subsystem dries the steam generated in the steam generation subsystem, the steam flow is controlled by the steam flow subsystem. In an example embodiment, steam may first be generated in a boiler at a pressure of about 1.5 bars to 5 bars (e.g., 20 pounds per square inch (PSI) to 73 PSI), which may require a temperature of about 115-160 degrees Celsius. Once the steam pressure is reduced to atmospheric pressure, the condensation temperature or saturation temperature of the steam may be about 100 degrees Celsius. If the steam is mixed with a carrier gas (e.g., air or nitrogen) by the flow subsystem, the condensation temperature may be the dew point of the mixture. It should be appreciated that the steam may or may not be mixed with a carrier gas in the techniques described herein. To avoid adding additional humidity and/or moisture into the printer environment, it may be desirable to shut the steam off (i.e., inhibit steam flow) when the steam is not being dispensed on the powder bed 124. Additionally, the steam flow rate may be controlled to promote the correct amount of condensate being applied to the powder bed 124. Too little condensate may not prevent the ejecta problems described above, and too much condensate may cause "bleeding," whereby the binder may spread into unprinted areas. This may result in defective parts or "macro-porosity" whereby trapped air between layers may leave large voids or pores in finished parts.

Figure 4:
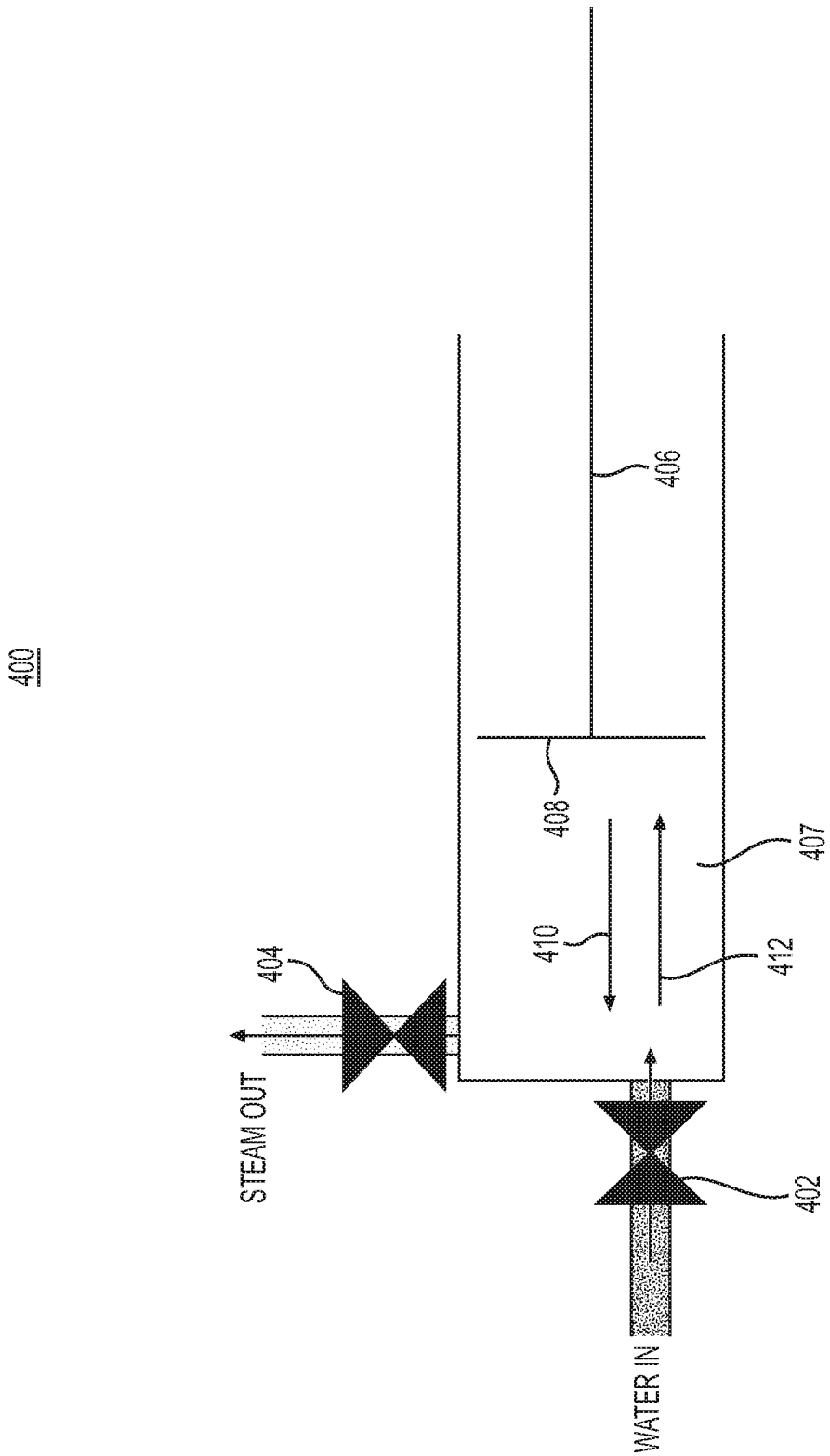
FIG. 4 is a diagram of an example valve and piston system of the steam delivery device configured to control steam flow, according to aspects of the present invention.

Reference is now made to FIG. 4, which provides an example of a steam flow control system. FIG. 4 shows a first valve 402 and a second valve 404. FIG. 4 also shows a piston 406 and a piston chamber 407. The first valve 402 is interfaced between a closed volume that contains the generated and dried steam (e.g., the closed volume of a boiler, described above, after the steam drying subsystem 220 processes are applied to the generated steam) and the piston 406. The second valve 404 is interfaced between the piston 406 and a flow control orifice, capillary tube, piece of sintered metal, or nozzle (e.g., discharge orifice 130 described in connection with FIG. 1B, above). In an initial configuration of FIG. 4, the piston 406 may be fully extended. For example, in an initial configuration, a surface 408 of the piston 406 may be extended in the chamber 407 toward the valve 402, as shown by arrow 410. As the valve 402 opens, steam may enter the chamber 407 from the boiler, and the piston 406 may retract for a partial distance away from the valve 402, as shown by the arrow 412, as the chamber 407 fills with steam from the boiler at the boiler pressure. The valve 402 may then close, and the piston 406 may continue to retract further in the chamber 407 in the direction shown by arrow 412 until the pressure in the chamber 407 is reduced, e.g., to atmospheric pressure. When the pressure in the chamber 407 is reduced to atmospheric pressure, the second valve 404 may open, allowing the piston 406 to extend back in the direction 410 in the chamber 407, and the steam may flow out of the chamber 407 through valve 404 to the nozzle/flow control orifice of the steam distribution subsystem. Thus, the valve and piston system 400 of FIG. 4 may provide more precise control of the steam flow rate. This control of steam flow rate may be driven directly or indirectly from the pressure of the closed volume (e.g., the boiler in the steam generation subsystem). For example, the pressure in the steam generator may be measured directly and feedback may be provided to heaters of the pressure generator to heat the water to appropriate temperatures, or the temperature of the water in the closed volume of the steam generator may be measured to indirectly measure the pressure within the steam generator, or both.

The flow of steam may also be achieved by controlling the pressure in the boiler of the steam generation subsystem, and then opening a valve to apply the pressurized steam to a flow control orifice. In this way, the steam generator, steam dryer and flow control functions may all be performed by the boiler. In another embodiment, a mass flow controller may be used to control the steam flow. The steam may be mixed with a carrier gas, such as air, nitrogen, or another suitable inert gas. The ratio of steam to gas may be controlled by using a mass flow controller, controlled pressure, and a precision orifice, or any other method known in the art for controlling the flow rate of gas. The steam/gas mixture may then flow through the steam distribution subsystem and the steam deposition subsystem to the powder bed 124. Accordingly, in one embodiment a steam generator may produce steam at a pressure that is elevated above atmospheric pressure, and the steam flow rate may be controlled by means of a precision orifice and closed-loop control of the temperature and/or pressure of the boiler.

Turning back to FIG. 4, to prevent a significant pressure drop in the boiler of the steam generation subsystem when the valve 402 opens, the boiler that generates the steam may be designed to have an adequate capacity (e.g., two to ten standard liters). For example, a boiler with five bars of pressure may have ten standard liters of capacity with two liters of volume for the steam (i.e., space above the water).

Figure 5:
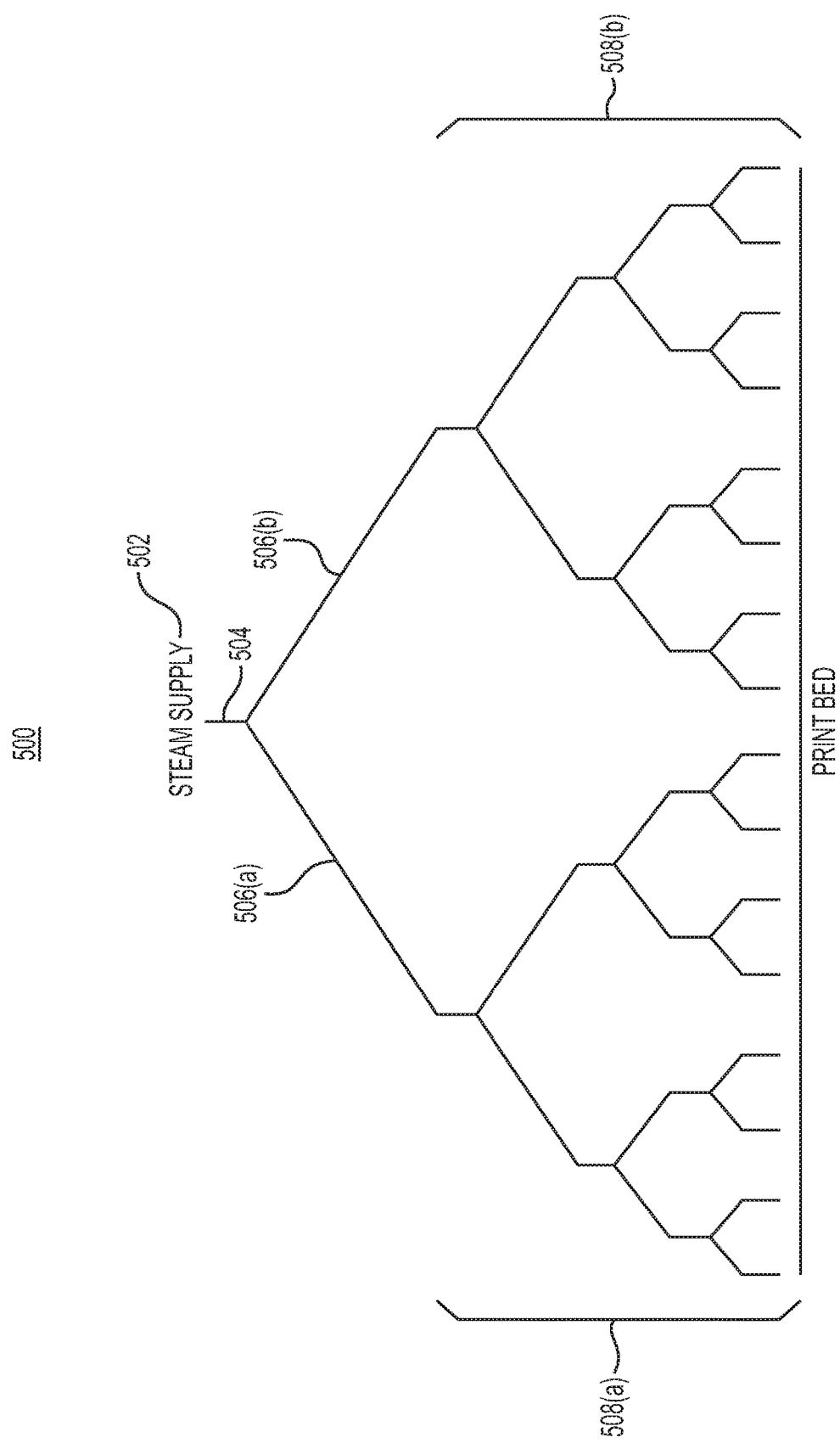
FIG. 5 is a diagram of an example steam distribution network, according to aspects of the present invention.

Reference is now made to FIG. 5, which shows an example steam distribution network 500 that may be incorporated as a part of the steam distribution subsystem to perform step 240. Steam distribution is a method used to facilitate more uniform exit of the steam from the steam distribution subsystem so that there is not more steam distributed on one side of the powder bed 124 than the other. Uniform distribution of steam is desirable for printing, since either too much or too little steam may cause defects, as described above. The steam distribution system may facilitate pressure that is uniform from end-to-end (e.g., for the dimension that spans the powder bed 124) so that exit flow of the steam from the nozzle is more uniform. One method of accomplishing this is to use the steam distribution network 500 shown in FIG. 5. The steam distribution network 500 is, for example, a branching network. FIG. 5 shows a steam source 502, which may be receive the steam that egresses from the steam flow subsystem e.g., the piston chamber 407 in FIG. 4. The source 502 may route the steam into a first flow path, shown at 504. The first flow path may bifurcate into two subsequent flow paths 506(*a*) and 506(*b*). Each of the subsequent flow paths may in turn split into additional flow paths, as shown at reference numeral 508(*a*) and 508(*b*). Thus, the steam distribution network 500 is a branching network that splits one path into two, and each path continues breaking off into two subsequent paths, until there are multiple evenly distributed paths for the steam to flow. While four levels of branching are shown in FIG. 5, it should be appreciated that more or less branching may be appropriate for use. In this distribution approach, each of the branching paths is well matched so that the pressure drop across all the paths are adequately matched. Accordingly, uneven pressure differentials may be avoided and steam may be uniformly distributed across the powder bed 124. It may be desirable to keep the flow velocity relatively constant as the flow branches to avoid dynamic pressure changes. This may be accomplished by keeping the flow area constant. For example, if the channel bifurcates, then each branch may have ½ the flow area of the input path. In some embodiments, instead of, or in addition to, a branching system, steam distribution may be accomplished by using an adequately sized plenum space with a diffuser.

Figure 6A:
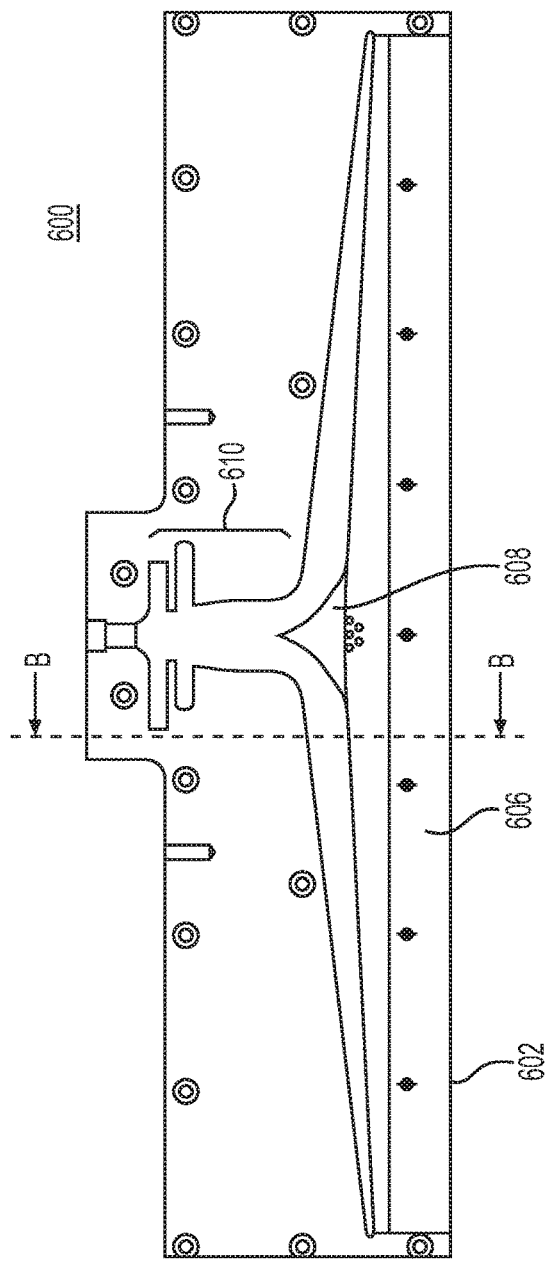
FIGS. 6A and 6B are diagrams of an example nozzle system of the steam delivery device to deliver steam onto the powder bed, according to aspects of the present invention.
Figure 6B:
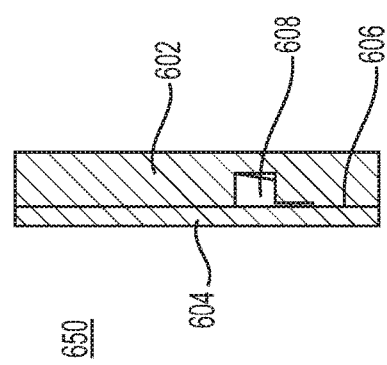

Reference is now made to FIGS. 6A and 6B, which shows an example steam distribution system and nozzle system ("nozzle") of the steam delivery device to deliver steam above and onto the powder bed 124. FIG. 6A shows a plane view 600 of the nozzle, and FIG. 6B shows a cross sectional view 650 of the nozzle along line B-B. The nozzle may be part of the steam distribution and deposition subsystem (and may include the flow control orifice described herein) to deliver the steam to the powder bed 124. The nozzle in FIGS. 6A and 6B may comprise two substantially parallel plates shown at reference numerals 602 and 604, and steam may be deposited along the full width of the plates or along less than the full width of the plates. Plate 602 may include one or more cutouts. The plates 602 and 604 may be separated by a gap 606 through which steam flows and egresses the flow control orifice. In one example, the gap 606 between plate 602 and 604 may form a slit of about 0.1 to about 0.3 millimeters (mm) wide (e.g., at the closest/narrowest approach between plate 602 and plate 604) and about 20 mm long (e.g., at the farthest/widest approach between plate 602 and 604), and thus the nozzle may distribute steam across the width of the powder bed 124, which may be about 340 mm.

The gap between the plates 602 and 604 may be configured to create a sufficient pressure drop to enable uniform steam flow from the steam distribution subsystem 240. For example, the pressure drop in the direction of steam flow may be large in comparison to the pressure drop within branching regions transverse to the steam flow. For example, the pressure drop in the direction of the steam flow may be at least around ten times larger than the pressure drop within the branching regions transverse to the steam flow. In some examples, the pressure drop in the direction of the steam flow may be between around 100 times larger to around 1000 times larger than the pressure drop in the branching regions transverse to the steam flow. The pressure drop may depend, at least in part, on one or more of the steam flow rate, properties of the flowing gas, and the dimensions of the nozzle. The pressure drop may be sensitive to the gap 606 between plate 602 and 604. For example, at a constant flow rate, the pressure may vary with the inverse of the gap to the third exponential power. The pressure drop range may vary depending on the desired flow rate and the geometry of the nozzle. For example, pressure drops along the direction of the flow rate may vary based upon the geometry of the nozzle, the flowrate, and the properties of the flowing material. The pressure drop (e.g., the pressure at the distribution nozzle inlet relative to atmospheric pressure) may be in the range of from about 100 pascals or less, from about 100 pascals to about 5000 pascals, for example, from about 100 pascals to about 500 pascals, or from about 1000 pascals to about 5000 pascals.

A plenum space, shown at reference numeral 608, may be located above the gap 606. As shown in FIG. 6B, plenum space 608 may be comparatively substantially larger than gap 606. Steam may be introduced into a central region of nozzle and may be distributed across the width of nozzle in the plenum. The steam may flow out of the plenum and through the gap 606. In one example, the nozzle is a slot formed by the gap 606 between the plates 602 and 604, and the steam deposition system of FIGS. 6A and 6B thus may consist of a manifold (shown at reference numeral 610) at a plenum (located between the plenum space 608 and the gap 606).

The nozzle enables steam to be applied to the powder bed 124. The nozzle may be spaced from the powder bed 124 by about 1 to about 5 mm. In one example, it may desirable for the steam to have an exit velocity of at least 1 meters per second (m/s) so that steam will reliably cross the gap between the nozzle and the powder bed 124 to deposit on the powder bed 124. On the other hand, the velocity of the steam may be less than about 5-10 m/s, e.g., so that the steam does not directly disturb the powder in the powder bed 124.

Reference is now made to FIG. 7, which shows another example nozzle 700 made up of an array of orifices. In one example, FIG. 7 shows an alternative to the slot nozzle described in connection with FIGS. 6A and 6B. The slot nozzle in FIGS. 6A and 6B may be designed to create a pressure drop (e.g., on the order of 100 or more pascals) from viscous pressure losses. Having a larger pressure drop may make steam distribution easier to achieve but may require a more consistent spacing gap between plates 604 and 602 and a smaller spacing gap (e.g., 0.1 to 0.3 mm). The nozzle in FIG. 7 may allow for the achievement of a range of ejection velocities with easily obtained diameter tolerances with pressure drop requirements that are lower than those for the slot nozzle in FIGS. 6A and 6B. For example, the nozzle in FIG. 7 may operate using a pressure drop on the order of only 1 pascal.

The nozzle 700 of FIG. 7 shows an orifice plate 702 with many small holes (e.g., orifices), shown at reference numeral 704, that each have a substantially consistent diameter. Depending on whether pure steam or steam with a carrier gas is being deposited on the powder bed 124, different size orifices may be disposed on the plate 702. For example, for pure steam dispersion, hole diameters ranging from about 200 and about 500 microns may be used. When using steam mixed with a carrier gas, it may be preferable to use larger hole diameters, e.g., ranging from about 500 to about 750 microns. Steam is distributed to the powder bed 124 through each of the holes 704 in the plate 702. In some embodiments, as described above with reference to nozzle 700, a plenum may be located above the orifice plate 702. Steam may enter nozzle 700 in a central region, and may be distributed across the width of nozzle 700 in the plenum. The steam may then flow out of the plenum and through the holes 704 on the orifice plate 702.

A filter plate may be used in a similar manner as the orifice plate. Filtration may be needed to prevent clogging of an orifice. In some embodiments, a singular long slit having a uniform width may be used for steam deposition. The slit may have a uniform width because deviation in the width across the length of the slit may cause a variation in steam flow and could affect the amount of steam deposited on the powder bed 124. The slit may be thin, such that the pressure drop across the nozzle is small (e.g., on the order of a few pascals), thus making it possible for the steam distribution system to control pressure end-to-end within a small fraction of a pascal. Alternatively, the slit may be thick, on the order of about 10 mm wide, increasing the pressure drop to around 100 pascals and making the steam distribution design simpler, but tolerances may be more difficult to achieve. In one example, multiple shorter length slits may be used as an option for the nozzle. Small length slits may allow for tighter width tolerances. As an example, steam may pass through a slit that may be about 0.1 to 0.3 mm thick for a powder bed length that may be about 340 mm wide and about 20 mm long.

In some embodiments, use of a compaction roller may be combined with application of the steam dispersion. For example, a heated compaction roller may dispense steam while compacting the powder bed 124. In some aspects, the compaction roller may be maintained at a temperature above the condensation temperature of the steam, e.g., to make it more difficult for the powder to stick to the compaction roller. Another embodiment may include a heated tube that rotates inside another heated tube, and each of the two tubes may have long slits that, when rotated, may align and may allow for steam to exit.

In some aspects, it may be desirable to tailor the amount of steam deposited on the powder bed 124 for different metal powders or for different printing conditions, such as changes in layer thickness, relative humidity or bed temperature. Temperature and relative humidity could affect the steam deposition by possibly changing the driving force for condensation (e.g., by causing an amount of water to already be present in the powder).

In one exemplary embodiment, steam may be generated by a boiler to a pressure of about 1.5 to about 5 bar gauge and a temperature of about 115 to about 160 degrees Celsius. To dry the steam, the flow path downstream of the boiler may be maintained at about 5 to about 20 degrees Celsius hotter than a condensation temperature of the steam. The condensation temperature at boiler pressures may be the boiler temperature. Once the steam pressure is reduced to atmospheric pressure, the condensation temperature may be about 100 degrees Celsius, and, if the steam is mixed with a carrier gas, the condensation temperature may be the dew point of the mixture. The steam flow may be stopped when steam is not actually being dispensed over the powder bed in order to avoid adding additional humidity or moisture into the printer environment. To stop the flow of steam, a valve may be closed. To again allow steam to pass through a flow-control orifice, a valve may then be opened. The flow control orifice may be about 100 to about 1,000 microns in diameter and may be a precision ruby orifice.

To prevent a significant pressure drop in the boiler when the valve is opened to allow for steam flow, the boiler may be designed to have an adequate capacity, e.g., about 2 to about 10 standard liters, as described above. For example, a 5 bar boiler may have 10 standard liters of capacity at 2 liters of volume for the steam (located above the water). In other embodiments, however, as described above, liquid may occupy more of the boiler than vapor, per unit of volume. For example, a boiler of about 100 mm in diameter and about 300 mm tall may contain about 150 to about 250 mm of liquid. The fluid capacity of a given boiler may depend not only on the volume of the boiler, but also the height of the boiler, because it may not be desirable for the liquid to bubble or slosh out of the boiler, and the prevention of bubbling or sloshing may depend in turn on the height of the boiler.

Once steam is generated, the steam may then be flowed through a diffuser that is fluidly coupled to a plenum to distribute the steam to a nozzle. In this exemplary embodiment, the nozzle may be a 300 micron wide slit of about 20 mm long and may distribute steam across a powder bed having a width of about 340 mm. Although this embodiment is not limiting, it provides an example of how the steam generation, steam drying, steam flow, steam distribution, and steam deposition may be structurally achieved.

In one exemplary embodiment, steam may be generated in a boiler, and a steam valve may be opened and closed to control output of the steam, as described above. An orifice or other suitable flow-control device may be used to control the flow of steam, and as the steam exits the orifice, the pressure may be just above atmospheric pressure. The steam may then flow to a nozzle, like the nozzles described in FIGS. 6A, 6B, and 7, and the pressure drop through the nozzle may be 100 pascals or less. The steam output from the nozzle may be deposited on a powder bed.

As discussed above, when generating steam with a boiler, pressure may be controlled, and there may be tradeoffs in setting the boiler pressure. Higher pressures may achieve a required flow rate at lower volumes. Higher pressures may require use of higher temperatures, and, as a result, the steam pressure may be less sensitive to changes in temperature. On the other hand, lower pressures may be used with larger flow control orifices (e.g., nozzles) for steam deposition, and the flow coefficient may be controlled to a tighter percentage (e.g., precision orifices typically have a tolerance of around 5 microns, so larger orifices may have smaller percentage variations). Also, at pressure ratios across the orifice above about 2:1, the flow of steam may become a choked flow. In this regime, the flow rate may not depend on the downstream pressure. As a result, the flow may vary proportionally with pressure instead of with the square root of pressure, which may occur at low pressure ratios where the flow is limited by the dynamic pressure. For example, in a choked flow regime, the mass flow may change 10% for a 10% change in pressure, but at low pressure ratios, the mass flow may change 5% for a 10% change in pressure. That is, it may be desirable to operate below a choked flow regime so that the flow rate is less sensitive to pressure.

It should be appreciated that the methods and systems described above are set forth by way of example and not of limitation. Numerous variations, additions, omissions, and other modifications will be apparent to one of ordinary skill in the art. In addition, the order of presentation of method steps in the descriptions and drawings above is not intended to require this order of performing the recited steps, unless a particular order is expressly required or otherwise clear from the context. Thus, while particular embodiments have been shown and described, it will be apparent to those skilled in the art that various changes and modifications in form and details may be made therein without departing from the spirit and scope of this invention and are intended to form a part of the embodiment as defined by the following claims, which are interpreted in the broadest sense allowable by law.

What is claimed is:

1. A system for printing a three-dimensional object, the system comprising:
   a powder bed configured to receive one or more layers of metal powder;
   a vapor generator configured to heat a liquid to form a vapor;
   a drying subsystem configured to heat the vapor to produce a dry vapor; and
   a vapor deposition subsystem configured to deliver the dry vapor to a surface of the powder bed, wherein at least a portion of the vapor deposition subsystem is moveable relative to the powder bed to deposit the dry vapor.

2. The system of claim 1, wherein the vapor generator includes at least one of a boiler, a heated surface, a heating coil, or an atomizing nozzle.

3. The method of claim 1, further comprising a vapor distribution subsystem configured to distribute the dry vapor across the deposition subsystem.

4. The system of claim 3, wherein the vapor distribution subsystem includes at least one of a branching distribution system or a plenum space.

5. The system of claim 1, wherein the vapor deposition subsystem includes at least one of an orifice plate, a nozzle, or a plenum space.

6. The system of claim 1, wherein the vapor deposition subsystem includes a pair of parallel plates spaced apart from one another to form a gap, wherein a first of the pair of parallel plates defines a plurality of openings, and wherein a second of the pair of parallel plates has a first surface facing the first parallel plate and a second surface adjacent to a plenum space.

7. A system for printing a three-dimensional object, the system comprising:
   a powder bed configured to receive one or more layers of metal powder;
   a boiler configured to heat a liquid to form a vapor;
   a heater for heating the vapor to produce a dry vapor;
   a diffuser fluidly coupled to a plenum space; and
   a nozzle fluidly coupled to the plenum space and configured to deliver the dry vapor to the powder bed.

8. The system of claim 7, further comprising a valve configured to control a flow of the dry vapor.

9. The system of claim 7, wherein the nozzle includes a pair of parallel plates spaced apart from one another to form a gap, wherein a first of the pair of parallel plates defines a plurality of openings, and wherein a second of the pair of parallel plates has a first surface facing the first parallel plate and a second surface adjacent to the plenum space.

10. The system of claim 7, further comprising a branching distribution system fluidly connected to the plenum space.

11. The system of claim 7, further comprising a piston system fluidly coupled to the boiler.

12. The system of claim 7, wherein the nozzle includes an orifice plate.

13. The system of claim 1 wherein vapor generator is configured to control a flow of the vapor by adjusting a pressure in the vapor generator.

14. The system of claim 1 wherein vapor generator is configured to control a flow of the vapor by adjusting a temperature in the vapor generator.

15. The system of claim 7 wherein boiler is configured to control of a flow of the vapor by adjusting a pressure in the boiler.

16. The system of claim 7 wherein boiler is configured to control of a flow of the vapor by adjusting a temperature in the boiler.

\* \* \* \* \*